(12) United States Patent
Selivansky

(10) Patent No.: US 9,896,382 B2
(45) Date of Patent: Feb. 20, 2018

(54) FIBER-REINFORCED STRUCTURES AND PROCESSES FOR THEIR MANUFACTURE

(76) Inventor: Dror Selivansky, Haifa (IL)

( * ) Notice: Subject to any disclaimer, the term of this patent is extended or adjusted under 35 U.S.C. 154(b) by 1400 days.

(21) Appl. No.: 13/505,484

(22) PCT Filed: Nov. 2, 2010

(86) PCT No.: PCT/IL2010/000908
§ 371 (c)(1),
(2), (4) Date: May 2, 2012

(87) PCT Pub. No.: WO2011/051951
PCT Pub. Date: May 5, 2011

(65) Prior Publication Data
US 2012/0328821 A1 Dec. 27, 2012

Related U.S. Application Data

(60) Provisional application No. 61/257,274, filed on Nov. 2, 2009.

(51) Int. Cl.
*C04B 16/06* (2006.01)
*C08J 5/04* (2006.01)
(Continued)

(52) U.S. Cl.
CPC ............... *C04B 28/02* (2013.01); *B32B 5/02* (2013.01); *C04B 16/06* (2013.01);
(Continued)

(58) Field of Classification Search
CPC . C04B 16/06; C04B 16/0616; C04B 16/0625; C04B 16/0633; C04B 16/0683;
(Continued)

(56) References Cited

U.S. PATENT DOCUMENTS 4,285,168 A * 8/1981 Scheetz ................... C08L 75/04
428/91
4,449,774 A * 5/1984 Takashi ............... B29C 47/0004
428/85

(Continued)

FOREIGN PATENT DOCUMENTS

CN 101774775 A * 7/2010
DE 102005027982 12/2006
(Continued)

OTHER PUBLICATIONS

F. Rodriguez, Principles of Polymer Systems, Hemisphere Publishing Corp, $2^{nd}$ ed., p. 423, 1982.*

*Primary Examiner* — Cheryl Juska
(74) *Attorney, Agent, or Firm* — Mark M. Friedman

(57) ABSTRACT

Disclosed is a structure of a matrix, reinforced with a plurality of polymeric fibers protruding from at least a portion of the structure surface, the fibers being capable of endowing (attributing) the at least a portion of the surface-with biological or chemical resistance. In some embodiments, the polymeric fibers, as further discussed hereinbelow, contain or are coated with at least one biological or chemical agent which further contributes to the endowment of biological or chemical resistance.

11 Claims, 1 Drawing Sheet

(51) Int. Cl.
  *C04B 28/02*   (2006.01)
  *B32B 5/02*    (2006.01)
  *C04B 20/00*   (2006.01)
  *C04B 20/10*   (2006.01)
  *C04B 20/02*   (2006.01)
  *C08J 5/06*    (2006.01)
  *C04B 111/20*  (2006.01)
  *C04B 103/60*  (2006.01)
  *C04B 103/67*  (2006.01)

(52) U.S. Cl.
  CPC ...... *C04B 16/0616* (2013.01); *C04B 20/0048* (2013.01); *C04B 20/02* (2013.01); *C04B 20/023* (2013.01); *C04B 20/10* (2013.01); *C04B 20/1062* (2013.01); *C08J 5/046* (2013.01); *C08J 5/06* (2013.01); *C04B 2103/60* (2013.01); *C04B 2103/67* (2013.01); *C04B 2111/20* (2013.01); *C04B 2111/2092* (2013.01); *Y02W 30/97* (2015.05); *Y10T 428/2395* (2015.04); *Y10T 428/23957* (2015.04); *Y10T 428/23979* (2015.04); *Y10T 428/23986* (2015.04); *Y10T 428/23993* (2015.04)

(58) Field of Classification Search
  CPC ..... C04B 16/0691; C04B 20/10; C04B 20/02; C04B 20/006; C08J 5/04; C08J 5/046; C08J 5/06; B32B 5/02; Y10T 428/2395; Y10T 428/23986; Y10T 428/23957
  USPC .......... 428/292.1, 294.7, 91, 97, 96
  See application file for complete search history.

(56) References Cited

U.S. PATENT DOCUMENTS

| | | | | |
|---|---|---|---|---|
| 4,927,684 A  * | 5/1990  | Asensio ................. | B29C 70/08 | 264/243 |
| 5,477,580 A  * | 12/1995 | Buysse ................ | A46B 13/008 | 15/180 |
| 6,001,476 A  * | 12/1999 | Selivansky ......... | C04B 16/0691 | 428/395 |
| 6,162,845 A  * | 12/2000 | Freed ..................... | C04B 16/06 | 424/404 |
| 6,645,610 B1 * | 11/2003 | Reis .................... | B29C 37/0082 | 428/297.4 |
| 6,777,103 B2 * | 8/2004  | Merkley ................ | C04B 18/24 | 162/10 |
| 7,045,209 B1 * | 5/2006  | Selivansky ......... | C04B 16/0633 | 428/359 |
| 7,213,289 B2 * | 5/2007  | Jaffe .................... | A46B 5/0008 | 15/23 |
| 7,632,348 B2 * | 12/2009 | Cowan ................... | C04B 16/08 | 106/724 |
| 8,168,027 B2 * | 5/2012  | Jacobsen ............. | B29C 37/0082 | 156/247 |
| 8,906,500 B2 * | 12/2014 | Peng ................... | C04B 20/1029 | 428/312.4 |
| 2006/0035097 A1 * | 2/2006 | Batdorf ................. | A01N 25/10 | 428/507 |
| 2006/0188719 A1 * | 8/2006 | Selivansky ......... | C04B 16/0633 | 428/375 |
| 2007/0110980 A1 * | 5/2007 | Shah ...................... | B32B 13/14 | 428/294.7 |
| 2007/0110981 A1 * | 5/2007 | Killilea ................ | C04B 41/009 | 428/294.7 |
| 2007/0154505 A1 | 7/2007 | Manico et al. | | |
| 2008/0148999 A1 * | 6/2008 | Luo ........................ | C04B 18/24 | 106/805 |
| 2009/0186549 A1 * | 7/2009 | Bennett .................. | E04C 2/043 | 442/348 |
| 2010/0047512 A1 * | 2/2010 | Morrison ................ | B28B 1/52 | 428/86 |
| 2013/0333323 A1 * | 12/2013 | Anderson ............. | D21H 21/36 | 52/741.3 |
| 2014/0356606 A1 * | 12/2014 | Ren ........................ | C04B 28/02 | 428/220 |
| 2014/0357756 A1 * | 12/2014 | Kampalli ............... | C04B 26/06 | 523/122 |

FOREIGN PATENT DOCUMENTS

| | | | | |
|---|---|---|---|---|
| EP | 1788130 | | 5/2007 | |
| JP | 63067326 A | * | 3/1988 | |
| KR | 20100025230 A | * | 3/2010 | ............. C04B 28/02 |

* cited by examiner

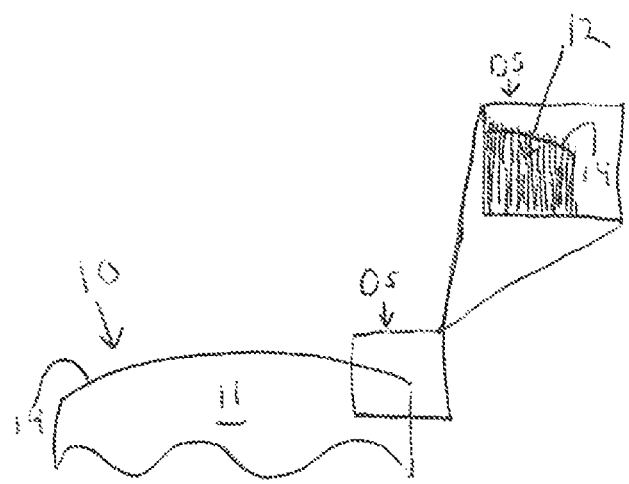

FIBER-REINFORCED STRUCTURES AND PROCESSES FOR THEIR MANUFACTURE

FIELD OF THE INVENTION

This invention generally relates to structures reinforced with fibers which attribute the material, in addition to material reinforcement, also with at least one property, such as fire retarding and anti-biofouling characteristics; and processes for the manufacture of such structures.

BACKGROUND OF THE INVENTION

With the increasing applications of fibers for reinforcement of constructive elements, short cut (3-40 mm) fibers of high content and great surface area (diameters within the range of 1-40 micrometers) have been dispersed in concretes, asphalts and plastics for effective reinforcement performance (1-3).

Modification of the aforementioned fibers with novel chemistry, special structure/properties and innovative architecture of reinforcement, brings about effective upgrading of various properties of the matrix that they reinforce.

Accordingly, such fibers may be used for upgrading other properties of the matrix in addition to structural reinforcement, functioning as additives for protection of the matrix (admixtures) against chemical and biological corrosion and fire.

There have been several commercial applications of fibers as additives in concretes, asphalts, plastics and yarns/fabrics for the above purposes. Some of which include:
polypropylene and Nylon fibers have been heavily used to protect concretes against fire (4).
biocides containing fibers have been used for the protection against bacteria and microorganisms in concretes (5).
membranes are protected by biocides against bio fouling (6).

REFERENCES (1) U.S. Pat. No. 5,399,195
(2) AFS Advanced Fibers Solution Inc., Asphalt Fibers Technical Data Sheet
(3) Fiber-reinforced composites: materials manufacturing and design, P.K Patrick, 1988, M. Dekker
(4) Adfil Construction Fibers, Ignis Fire protection fibers Technical Data Sheet
(5) U.S. Pat. No. 6,612,845
(6) U.S. Pat. No. 6,540,915

SUMMARY OF THE INVENTION

The technology being at the core of the present invention relates to the use of novel fibers in the construction of reinforced elements and methods for their preparation. The fibers effectively upgrade the inherent properties of the elements, as specified below.

The high content fibers of the invention are designed to protect the elements in which they are present, in accordance with the invention, via chemical and biological agents they contain. The agents interact effectively with the hazardous elements at the surface, and/or in the bulk of the matrix of the reinforced elements via direct contact of the fibers with the hazardous elements at the surface (high surface concentration of the fibers), or controlled release of the agents from the fibers, that diffuse to the hazardous elements.

BRIEF DESCRIPTION OF THE DRAWINGS

FIG. 1 shows a perspective and detail view of a structure in accordance with the present invention.

A. Protection Via Surface Interaction of the Fibers with the Environment

It is a purpose of the present invention, for example, as shown in FIG. 1, to provide a structure 10, of, for example, a matrix 11, reinforced with a plurality of polymeric fibers 12 (in the detail square DS) protruding from at least a portion of the structure surface 14, the fibers 12 being capable of endowing (attributing) the at least a portion of the surface 14 with biological or chemical resistance. In some embodiments, the polymeric fibers, as further discussed hereinbelow, contain or are coated with at least one biological or chemical agent which further contributes to the endowniwnt of biological or chemical resistance.

The invention also provides a fire-resistant structure reinforced with a plurality of polymeric fibers, optionally protruding from at least a portion of its surface. In some embodiments, a fire-resistant structure is provided in which the plurality of polymeric fibers protrude from at least a portion of its surface. In other embodiments, in a fire-resistant structure reinforced with a plurality of polymeric fibers, the fibers are at the at least a portion of the surface, e.g., substantially not protruding from the surface.

As disclosed herein, the invention contemplates a great variety of structures which are attributed with at least one property which the material (out of which the structure is made, absenting the fibers reinforcing it) is devoid of The structures of the invention may therefore be utilized in a great variety of applications, as will be further disclosed hereinbelow.

Within the context of the present application, the structure has a surface which may be external to the structure (namely exposed outwards to an environment) or an inner surface (namely exposed inwards into a cavity or channel within said structure) holding or being in contact with a certain environment. The structure, in accordance with the invention, may also be made of a hybrid material wherein the body (bulk) of the structure is of a first material while its surface is a coating of the same or a different material.

The structure is typically three-dimensional (element) which at least a portion of its surface is prone to one or more fully or partially destructive conditions which are associated with the environment to which it is exposed; the surface sensitivity to such conditions may be associated with the structure material, the conditions under which the structure is used, etc.

The structure may be made of a single material or a mixture of materials. Non-limiting examples of such materials include a plaster material, a cementitious material, a mortar, concrete, a polymeric material, plastic, a fabric, a yarn, a carbonaceous material, a paper material, a woven textile, a non-woven textile, a knitted textile, asphalt and others.

To increase its resistance to the destructive conditions associated with its final application or conditions under which the structure is employed, the surface of the structure is provided with a plurality of polymeric fibers, which may be of a single type of material or fibers of different materials and different mechanical and/or chemical characteristics, endowing its surface, and therefore the structure as a whole, with the required resistance. In accordance with the present invention, and depending on the application, the surface need not be fully coated with the plurality of polymeric fibers. In some embodiments, the complete three-dimensional surface of the structure is provided with the plurality of fibers. In other embodiments, only a portion of the surface is provided with the fibers; the portion of the surface may be substantially a two-dimensional (flat) surface, or a three-dimensional (non-flat) surface of the structure. The at least one portion of the surface may be one or more portions (regions) of the surface which are spaced apart (not connected with each other). The regions may be spaced apart in a predetermined pattern or may be randomly distributed. For example, where the structure is in the form of a tube, only its inner surface may be provided with a plurality of polymeric fibers.

In some embodiments, the structure may be in a form selected from tubing, a block, a flat element, a corrugated element, a container, and others. In some embodiments, the tubing element is a liquid communication element such as a water pipe, a waste conduit, a manhole, pumping tubing, water reservoir, pool and pond, pier, deck wave breakers, a desalination element and others as known in the field.

For certain applications, the structure of the invention is constructed to expose on its surface a plurality of polymeric fibers containing or being coated by an agent, i.e., a biological or a chemical agent, which is capable of endowing the surface of the structure with one or more property, as further disclosed below, or by endowing a property which the fibers themselves lack. Therefore, the polymeric fibers may be pre-treated to contain the biological or chemical agent by incorporating said agent into the polymeric fibers during their production stages, or alternatively, by coating the outer surface of the fibers by said agent.

The polymeric fibers are discrete elongated pieces of one or more polymeric materials, the fibers having a typical diameter of between about 1 and 40 micrometers, and in some embodiments of between about 1 and 30 micrometers. In some embodiments, the diameter is between about 5 and 25 micrometer, or between about 10 and 40 micrometer, or between about 20 and 40 micrometer or between about 15 and 25 micrometer.

The thickness of the fibers may alternatively be measured in decitex (dtex) units for fineness of fibers. In some embodiments, the thickness of the polymeric fibers is selected to be between about 0.01 to 10.0 dtex per fiber. In some embodiments, the thickness is between 1.0 and 6.0 dtex per fiber.

In further embodiments, the polymeric fibers are between about 2 and 80 millimeters in length, or between about 2 and 45 millimeters in length, or between about 10 and 45 millimeters in length, or between about 25 and 45 millimeters in length, or between about 2 and 36 millimeters in length, or between about 2 and 20 millimeters in length, or between about 10 and 20 millimeters in length.

The polymeric fibers may be made of any polymeric material or mixtures thereof. In some embodiments, the fibers are made of a. polymer selected from polyamides, polyethylene terephthalate, polybutylene terephthalate, polyacrylonitrile, polyvinyl alcohol, polypropylene, polyethylene and poly lactic acid. In some embodiments, the polymeric fibers are of a polyimide, such as Nylon 6 and Nylon 6.6.

In some embodiments, the fiber is selected from melt spun polymers and wet spun polymers.

In some embodiments, the melt spun polymer is selected amongst Nylons, polyesters, polypropylene, polyethylene, polyolefines, and poly(lactic acid). In some cases, the melt spun polymer is in the form of a partially oriented yarn (POY) made of a polymeric material selected from Nylon 6.6, Nylon 6, polyesters, polypropylenes, polyolefines, and poly(lactic acid).

In some embodiments, the POY is characterized by a tenacity range of 2.5 and 4.5 grams/dtex and an elongation range of 60%-130%.

The melt spun polymer may be in the form of a fully drawn yarn of a material selected from Nylon 6.6, Nylon 6, polyesters, polypropylenes, and polyolefines. In some embodiments, the yarn is characterized by a tenacity range of 4.6-9.0 grams/dtex and an elongation range of 5%-59%. In some embodiments, the tenacity range is of 5.0 and 7.0 grams/dtex and the elongation range is 10%-40%. In other embodiments, the tenacity range is 3.0-4.0 grams/dtex and the elongation range is 80%-110%.

In further embodiments, the melt spun polymer is in the form of a draw textured yarn of a material selected from Nylon 6.6, Nylon 6, polyesters, polypropylenes, polyolefines, and poly(lactic acid). In some embodiments, the yarn is characterized by a tenacity range of 4.0-6.0 grams/dtex and an elongation range of 30%-50%. In some embodiments, the tenacity range is of 4.5-6.0 grams/dtex and the elongation range is of 35%-45%.

In other embodiments, the wet spun polymer is selected amongst poly(acrylonitrile), polyvinyl alcohol), viscose rayon, and regenerated cellulose.

In some embodiments, the polymeric fibers are microfibers of high fiber content (number of fibers in a volume unit) and high surface area, thus bringing about a high efficiency in endowing the surface with the desired property, e.g., biofouling protection. Inhomogeneous dispersion of the fibers within the protected structure walls that concentrates the fibers at the surface and maximizes the contact area between the fibers and the environment. The direct contact between the fibers at the surface of the structure, on one hand, and the environment, on the other, is necessary to reduce or minimize exposure of the surface to the damaging environment.

The environment to which the surface of the structure is exposed, and which is said of potentially having a deteriorating or damaging effect on the surface structure, is any environment containing at least one biological or chemical entity which has the potential of causing short or long-term damage to the structure. Such environments may be solids, liquids, gases or solutions which come into direct contact with the surface of the structure. The environment may be aqueous or non-aqueous and may contain a chemical or a biological material (microorganism) that can cause damage to the structure. In some embodiments, the environment is water which may be standing water (as in the case of water reservoirs) or which may flow on the surface or in contact with the surface of the structure (as a water flow inside a pipe).

Therefore, the polymeric fibers containing or being coated with reactive agents are selectively localized at the surfaces of the structure, protruding into the environment (water in case of anti-biofouling applications) and forming contact with the environment e.g., water, at the wall-environment interface; thus, for example in antifouling applications, preventing settling of microorganisms on the structure surface and thereby preventing eventual fouling of the surface.

In some embodiments, the volume fraction of fibers in the element at the surface of the structure is between 0.025% and 25%. In some embodiments, the volume fraction is at least about 0.1%. In some embodiments, the volume fraction is between about 0.1% and 10%. In other embodiments, the volume fraction is between about 0.2 and 1%, or between about 0.2 and 0.5%, or between 0.1 and 0.2%.

In some embodiments, the fiber content at the surface is in the range of 100 million and 100,000 million fibers per a cubic meter. In other embodiments, the range is of 1,000 million and 10,000 million fibers per a cubic meter.

In other embodiments, the fiber content at the surface is between about 150 and 1,000 million fibers per a cubic meter. In other embodiments, the fiber content is between 500 and 1,000 million fibers per cubic meter.

In further embodiments, the number of protruding fibers per a surface area unit of the structure is between 1 and 100 fibers in a square mm. In other embodiments, the number of protruding fibers per a surface area unit of the structure is between 1 and 10 fibers in a square mm.

The biological or chemical agent is selected to be capable of endowing the fibers and thus the structure surface with a biological or chemical resistance to at least one biological or chemical effect, which in the absence of such fibers would eventually bring about a short-term or long-term damage. In the context of the invention, the biological or chemical agent one or more such agents selected to modulate one or more property of the structure material or surface, namely to improve its resistance to a certain environmental condition. In some embodiments, the resistance to such a condition is selected from resistance to biofouling, retarding fire and preventing fire-induced damage, resistance to corrosion, resistance to oxidation, resistance to surface-penetration by external agents and chemicals that damage the matrix, such as sulfates, carbon dioxide, chlorides, phosphates etc. The agent may thus be a biological agent selected from a biocide, a bacteriocide, a quorum sensing antagonist that retards bacteria growth and others. Where the agent is a chemical agent, it is typically selected from metal microparticles, metal nanoparticles, metal oxides, metal salts, fire retarding agents, corrosion resistance compounds, pH modulators, and UV resistance compounds.

Non-limiting examples of such agents include metal salts such as silver, zinc and copper; metal oxides such as silver oxide, zinc oxide, and copper oxide; organic biocides such as phenolic based products, Microban products, triclosan, salts of imazalil, ortho phenyl phenol, zinc pyrithione, tolyl diiodomethyl sulfone, oxathiazine, azole, chlorothalonil, triazin diamine and others.

In some embodiments, the biological agent is a quorum sensing antagonist capable of disturbing biofilms formation or bacteria production sequence. In some cases, the fibers comprise biocides in an amount ranging from 0.01% and 20.0% wt. In other cases, the amount of the biocide in or on the polymeric fibers is between 0.1% and 5.0% wt.

In some cases, the amount of the quorum antagonist in the fibers is between 0.001% and 5.00% wt.

In some embodiments, the weight concentration of the biological or chemical agent in or on the surface of the polymeric fibers is between about 0.1-15%, or between 1 and 10%, or between 5 and 10%, or between 10 and 15%, or between 0.1 and 1%. In some embodiments, the concentration is between about 0.1 and 1%.

In further embodiments, the overall content of the biological agent in the matrix is between about 5-100 ppm.

In some embodiments, the biocide is in the form of nano-sized particles of metal salts or oxides. In some embodiments, the particles having a diameter of at most 500 nanometers.

In seine embodiments, where the structure of the invention is a water conveying element, the polymeric fibers are selected to be capable of interacting with microorganisms and prevent their growth, thereby protecting the surface of the structure from biofouling, microorganism-induced corrosion (e.g., in concrete structures), hydrogen sulfide formation (e.g., in sewage systems) and other deterioration effects.

The fibers containing or being coated with the biological or chemical agents protrude from the surface and remain continuously exposed to the environment, e.g., remain in continuous contact with microorganisms which may have a deterioration effect on the surface. This prevents settling and growth of bacteria and other microorganisms on the surfaces, eliminating colony-formations that eventually results in biofouling and other associated effects at the surface of the structure, e.g., walls of the water treating elements.

The polymeric fibers employed are engineered to react to environmental conditions and to regulate the rate of release of the biological or chemical agents that diffuse therefrom and interact with the microorganisms at the surface. In some embodiments, Nylon fibers of high content of carboxyl end-groups (e.g., more than 80 meq/Kg), such as Nylon 6.6 or Nylon 6 fibers, are employed. In such embodiments, hydrolysis of the fibers ensues as the pH of the environment to which the fibers are exposed, e.g., water, decreases due to the effect exerted by the present microorganisms.

Similarly, in other embodiments, polyvinyl alcohol fibers, engineered to dissolve as the time and/or temperature increase, can serve to kinetically release the biological or chemical agents into the water and to maintain constant concentration of biocides at the surface in order to prevent microorganism growth.

In another of its aspects, the present invention provides a process for manufacturing a structure according to the invention, the process comprising:
  obtaining a mixture of a desired material (making up the bulk material of the structure, said desired material may be selected from a plaster material, a cementitious material, a mortar, concrete, a polymeric material, plastic, a fabric, a yarn, a carbonaceous material, a paper material and others) and a plurality of polymeric fibers containing or being coated with a biological or chemical agent;
  forming (e.g., by casting) a structure of said mixture; and
  treating at least a portion of the structure surface to expose the fibers' ends; to thereby obtain a structure having a plurality of polymeric fibers protruding from at least a portion of its surface, the fibers containing or being coated with at least one biological or chemical agent.

In another of its aspects, a structure devoid of polymeric fibers may be transformed into a structure according to the present invention by employing a process comprising:
  obtaining a structure of a desired material, as above;
  coating at least a portion of the structure surface with a material comprising a plurality of polymeric fibers; and
  treating the coating layer to expose the fibers' ends; to thereby obtain a structure having a plurality of polymeric fibers protruding from at least a portion of its surface, the fibers containing or being coated with at least one biological or chemical agent.

The structure of the invention having polymeric fibers protruding from at least a portion of its surface may be utilized for a great variety of applications. In some embodiments, the structure is an element of a water system or sewage and is an element such as a pipe, a concrete pipe, a manhole, a pumping element, a desalination element, and others.

In such embodiments, the fibers are selected for 'contact killing' of microorganisms coming in contact with the inner surface of the element (pipe channel). The fibers containing or carrying the biological or chemical agents are dispersed within the bulk of the structure (element) during batching. The fibers are then exposed at the inner surfaces of the structure using several possible methods:

a. After casting the element a retarding agent is applied to the surface via brushing or sprinkling, in order to retard the concrete hydration at the surface. After a minimum consolidation time of the cast elements (6-12 hours), the surface unbound cementitious components are rinsed off by pressurized water, exposing the ends of the fibers that protrude through the wall surface, while their other ends are bound to the deeper cementitious layers that are not affected by the retarder. This results in a dense layer of free fibers at the surface of the element wall.

The fibers may be exposed (excavated) also via mechanical abrasion (sand papering) of the surfaces, exposing the fibers protruding through the surface.

In some embodiments, where hydrophobic fibers such as polypropylene are employed, migration to the surface of the wet concrete during casting, results in the formation of high fiber concentration at the wall interface.

b. The structure may be formed or casted and subsequently thereto its surface may be coated with a grout that contains the reactive fibers and which is capable of partial dissolution or crumbling to expose the fibers at the surface after application (coating). This enables coating of newly formed elements during production in a separate stage and protection of old systems by coating existing pipes and the inner surfaces of other elements. Thus, this process enables the application also to cementitious as well as non-cementitious, e.g., plastic elements.

The coating applied to the at least a portion of the surface can be of a single coating layer or of multi layers. In some embodiments, the application is of at least two layers, the first being a base layer containing an adhesive (e.g., acrylic or epoxy based) that binds the grout to the substrate wall and a further top layer containing the cement matrix and fibers. The cement matrix can contain soluble polymers that form internal void-networks, increasing the contact area of the fibers with the water.

In some embodiments, a single coating layer may suffice. In such cases, the grout is a one layer system containing an adhesive, fibers and a cement system.

After coating the surface of the element with the coating material, the fibers may then be exposed using any of the methods disclosed above, e.g., through mechanical sand papering that crumbles parts of the dry cementitious powder, or via dissolution of part of the matrix, leaving the fibers protruding at the surfaces.

In other embodiments, the structure is a yarn which may be utilized for filtration in candle filters and in other types of filters, and which protection against biofouling microorganisms is required. In such structures, the protecting fibers protrude through the surface of the yarns forming a high degree of hairiness that is reassuring the contact of the reactive fibers with the water at the surface of the filters. The degree of hairiness could be controlled by the yarn formation process:

a. Texturizing of the reactive yarns to a high degree of crimp levels.

b. Employing any bulking, like the Taslan yarn forming method to generate hairy yarns that are incorporated into a bundle of yarns in the filters, contributing protruding reactive fibers.

In further embodiments, the structure is a fabric containing polymeric fibers. Such fabrics may be used as spacers in membranes. The reactive fibers protrude through the fabric surface and form high contact with the environment (water) around the fabric. Similarly to the production of yarns, the fabrics may be obtained via texturizing or via any of the bulk yarn formation methods.

B. Protection Via Bulk Distribution of the Fibers in the Matrix

The chemical characteristics of short cut synthetic fibers that are used for dispersion in concrete and cementitious materials are modified in order to enable dissolution of the fibers at predetermined conditions of environment pH, temperature and time.

Controlled dissolution of the fibers permits the controlled release of their contents, and for affecting the structure and characteristics of the concrete after their dissolution.

Controlled dissolution of the fibers is achieved in condensation polymers that undergo hydrolysis under specific conditions:

Polyamides (Nylon 6, Nyon 6.6) undergo hydrolysis as the pH drops.

This is used for dissolving the fibers in concretes that are attacked by bacteria and microorganisms that produce strong acids and by chemicals that reduce the pH of the concrete and deteriorate it.

Fibers containing biocides and corrosion resisting chemicals are dispersed in the concrete and dissolve to release their biocides and chemicals contents as the activity of the bacteria and the corroding chemicals increases.

Polyamides of imbalanced end groups with high carboxyl contents (more than 80 meq/Kg) undergo rapid hydrolysis in boiling water. This is being used for dissolving the fibers at the concrete's steam environment during fire.

Similarly, poly (ethylene terphthalate) fibers undergo hydrolysis in steam at the high pH conditions of the concrete.

Polyvinyl alcohol/acetate co-polyenes dissolve in water at a controlled time and temperature kinetics. Fibers spun from the co-monomer composition that dissolves readily in boiling water are used to percolate the concrete and release the steam pressure in fire.

Further examples of the applications in fire resistance and chemical corrosion resistance are given below.

C. Methods of Incorporating the Chemical Agents into the Fibers

During Fiber Formation:

In melt spinning—master batch of the reactive metal salts/oxides is incorporated into the molten polymers during melt spinning of Nylon, polyethylene and polypropylene and other thermoplastic fibers at high processing temperatures of up to 300° C.

Standard master batching of the additives with the polymers is applied for spinning the polymers containing the additives.

Standard silver additives have been used in Nylon 6.6 fibers, following the recommended procedure of the manufacturer: (e.g: Milliken Corp. "Alphasan silver inorganic antimicrobial technology").

In wet spinning—dispersing the bacteriocide in the dope (solution of polymer in the spinning solvent) and spinning through the spinneret into the coagulaton bath at relatively low temperatures (50-150° C.) enables incorporation of organic biocides of lower thermal stability.

Injecting dispersions of the agents in the solvent into the spinning line before the spinneret enables increasing the biocides concentration in the fibers to the levels beyond 10%.

After treatment: Impregnation of the fibers with the reactive agent, squeezing and drying to a predetermined dry pick up.

DETAILED DESCRIPTION OF EMBODIMENTS

1. Protection Via Surface Interaction of the Fibers with the Environment

Various embodiments and aspects of the invention as delineated hereinabove and as claimed in the claims section below find support in the following description and non-limiting examples.

Chemical agents for killing, repulsing or inhibiting growth of microorganisms in water are incorporated into the polymeric fibers during production by, e.g., fiber-spinning, or as surface coating on the fibers. The treated fibers are incorporated into structures such as concrete structures and provide protection against microorganisms that cause biofouling, corrosion, hydrogen sulfide formation, etc, via interaction of the chemical agent in the fibers with the microorganisms. Such chemical agents may be metal-ion bearing compounds, such as metallic silver, nano silver ions dispersion, zinc oxide, copper oxides and copper salts, organic bacteriocides, such as triclosan, imzazlil salts, o-phenyl phenol and zinc pyrithione, and organic quorum sensing antagonists which retard the activity of receptors in the microorganisms. The chemical agent is typically loaded into the fibers at a concentration of between about 0.1% and 15% wt.

The herein disclosed invention is based on the usage of fine diameter microfibers, having a large surface area, dispersed inhomogeneously within the structure element in order to obtain a dense fiber-loaded surface of the protected element. The concentration of the fibers at the surface of the protected element is usually between about 0.015% vol and about 0.5% vol, thereby obtaining a fiber concentration of between about 150 million and about 1,000 million fibers per cubic meter. This is equivalent to about 1 and about 20 fibers per millimeter square. A direct contact between the fibers at the surface of the element and the environment, e.g., water, is necessary in order to eliminate microorganism accumulation upon settling on the element walls. In order to obtain a direct contact between the fibers and the microorganisms, the surface of the protected element is treated to expose the fibers, causing them to protrude into the water and to form direct contact with the microorganisms at the element/water interfaces. The direct contact between the chemical-loaded fibers and the microorganisms causes prevention of the settlement and growth of bacteria and other microorganisms on the surface of the protected element, eliminating biofouling colonies formation and other associated effects, such as corrosion. By careful selection of the material out of which the fiber is made, the fibers can be engineered to react to environmental conditions and to regulate the rate of release of the biological or chemical agents contained therein. Such materials may be Nylon 6.6 or Nylon 6 polymers of balanced carboxyl end-groups, i.e., 70 meq/kg or non-balanced carboxyl end-groups, i.e., more than 80 meq/kg, which undergo enhanced hydrolysis as the pH of the water decreases due to the effect exerted by the bacteria-related processes. Another material may be polyvinyl alcohol, engineered to decompose with a time and/or temperature increase, which can be used to kinetically control the release of the chemical agent from the fiber into the water to maintain constant concentration of chemical agent at the element/water interface.

The polymeric fibers are produced of polymers, such as Nylon 6.6, Nylon 6, poly(ethylene terephthlate), polyacrylonitrile, polyvinyl alcohol, polypropylene and polyethylene. The fibers are between about 1 mm and about 50 mm in length, and between about 1 and 40 micrometers in diameter, characterized by a 0.01-6.0 dtex, wherein the dtex measuring unit is defined as the mass of the fiber in grams of 10,000 m. In case the fibers are also used as a mechanical reinforcement of the concrete, covering the primary and the secondary ranges of reinforcement, the fibers should have a tenacity of between about 2.5 and about 9.0 grams per dtex and elongation of between about 5% and about 130%, that covers the types of Partially Oriented Yarns ($2^{nd}$ reinforcement) and Fully Drawn yarns (Primary reinforcement).

EXAMPLE 1

Fibers:
Nylon 6.6 partially oriented yarns containing nano silver
Tenacity—3.40 gpd, Elongation—75%
Thickness—50 Dtex, Count—40 filaments, dtex per filament—1.25, diameter—11 micrometers,
Cut length—6 mm.
Fiber Spinning:
The process comprising extruding at a given extrusion rate a plurality of streams of the molten polymer (300° C.) through spinneret capillaries into a quench zone, quenching the molten streams into filaments, withdrawing the filaments from the quench zone and converging the filaments into a yarn that is wound on a bobbin at the spinning speed.
Spinning speed is 4,000 m/min, Polymer Relative Viscosity is 40.
Adding the biocide:
Nano silver commercially available in the form of masterbatch of Nylon 6.6 containing the additive at a high concentration (15-25%): Alphasan silver inorganic anti bacterial agent, from Milliken Corp.
The masterbatch was metered into the extruder hopper separately, mixing with the regular Nylon chips feeding stream.
Silver content in the fibers: 0.3%.
Grout:
Cementitious grout of high cohesion with the concrete and plastic surfaces contained acrylic adhesive (one part) and cement powder (2.5 parts) and 0.2% by weigh of the above fibers.
Strips of grouts (5 mm thick) containing fibers and control grouts without fibers (reference) were prepared and subjected to biocide attack.
The fibers containing grouts were abraded at the surface to expose the fibers to the environment.
Test 1:
The strips were immersed in beakers with water containing vegetation for two weeks.
The reference strip without fibers developed heavy bio-organisms on the surface and in the water, while the water in the fibers containing strip remained clear and the strip stayed white after the two weeks.
Test 2:
Fibers: same as in Test 1.
Grout: contained acrylic adhesive (one part) and cement powder (2.5 parts) and 1% by weight of the above fibers. Grouts with and without fibers were prepared for a comparative test.
Application of the grouts: The grout coated the internal wall of a PVC pipe (5 cm diameter) using an adhesive layer to stick it to the wall. A 5 mm thick layer was applied manually and brushed after drying to excavate the fibers at the surface. Samples of pipes coated with the fibers containing cement, and with the reference grouts were prepared.

Short segments of the pipes were connected to the treated waste water line of a major waste treatment plant ("Shafdan") and were exposed to the treated waste water environment during two summer months (August-September). After exposure, the pipes were retrieved for inspection. The pipes with the fibers containing grouts were not affected and remained white, while the pipes with the control grout were heavily contaminated with a biofouling layer.

2. Protection Via Bulk Distribution of the Fibers in the Matrix

Synthetic Fibers for Increasing Fire Resistance of Concrete Structures

Condensation and addition polymers like Nylons, polyesters and polyvinyl alcohols that undergo hydrolysis and dissolution in water at high temperatures, are modified chemically, mechanically and geometrically in order to enhance their tendency for hydrolysis and dissolution in boiling water (100° C.) and also to enhance their capacity to form networks of inter-connected channels in the concretes (percolate). This facilitates the earlier disintegration and dissolution of the fibers by the concrete's steam in the event of fire, to form hollow channels connecting the cement/aggregates interconnect and free interfacial voids into an open network throughout the concrete volume, for early release of the steam generated in the concrete during fire.

Early evacuation of the water vapor pressure built up is also facilitated and release of the steam-pore pressure in the burning concrete that causes bursts, surface flaking and explosive spalling of the concrete in the event of fire as the concrete temperature rises.

The earlier evacuation of the steam in the event of fire is critical for the effectiveness of the protection of the concrete itself against bursting. The steam evacuated concrete is fire resistant, and serves as a protective layer for the concrete steel reinforcement; such fibers are therefore a very effective mean for protecting the steel reinforcement against fire in concrete structures.

The early fiber disintegration and concrete percolation is needed especially in the dense impermeable high performance concretes, where the pressure build-up in the event of fire is most rapid and catastrophic. The objective is thus to promote the pressure release at temperatures lower than 200° C. (that is the liquefying temperature of standard polypropylene reinforcing fibers that degrade at 250° C.), preferentially at the water boiling temperature.

Fibers that disintegrate in boiling water via hydrolysis (modified condensation polymers such as Nylon and polyester of higher hydrolysis rates) or fibers that dissolve in the boiling water (such as polyvinyl alcohol copolymers with polyvinyl acetate) are chemically suitable.

Fiber morphology of lower degree of crystallinity and orientation that increases the water permeability and degradation/dissolution rates may be utilized. For this reason, the usage of lower orientation and lower strength fibers with a high degree of shrinkage at the boiling temperature, manufactured at lower than standard draw ratios, is recommended (e.g., partially oriented yarns, un-drawn yarns, lower draw ratio yarns, etc).

In order to readily percolate the concrete matrix via the formation of continuous network of interconnected channels upon the disintegration of the fibers, that is capable of evacuation of the vapor pore pressure in the concrete, fibers geometry in terms of diameter and length should be optimized to enable most efficient pressure release at the lowest dosage of fibers in the concrete (e.g., short cut 6-12 mm long micro fibers of 10-19 micron diameter, and/or longer macro fibers of 19-40 mm in length and 100-500 microns in diameter).

Examples of suitable polymers for the earlier degradation fibers formation:

1. Nylon 6.6 and Nylon 6 modified chemically to have higher than the standard balanced carboxyl end groups (more than 80 meq/Kg) that catalyzes the hydrolysis by steam (low pH triggered hydrolysis).

2. Polyester fibers selected to be susceptible to water boiling temperature hydrolysis at the concrete high pH, having the right molecular weight and morphology for rapid hydrolysis at the boiling point of the water in the concrete:

Undrawn, high speed spun (POY) fibers of standard to lower molecular weight (Mn=10,000-30,000), birefringence values within the range of 0.001-0.060, density values within the range 1.33-139 gram/cubic centimeter, tenacity within the range 2.5-6.0 gram per denier and elongation range of 60-200%.

As the diffusivity rate of the hydroxyl in the concrete into the fibers controls the rate of hydrolysis, the lowest degree of crystallinity and the finer diameter of fibers bring about faster hydrolysis rates. Accordingly, microfibers of 1.0-3.0 denier per filament thickness and of densities within the above specified range and degrees of crystallinity measured by WAXS and defined by the Index of crystallinity to be no more than 0.40 are most suitable.

3. Polyvinyl alcohol/acetate copolymers obtained via incomplete acetate conversion to alcohol during the polyvinyl alcohol polymer formation, dissolve in water due to crystalline imperfections.

Fibers spun from the co-monomer composition containing the right residual content of acetyl groups within the vinyl acetate range of 0.1-5.0 mol %, dissolve at or below the boiling point of the water in the concrete (e.g., Kuralon fibers type WN7, WN8, WQ9, that dissolve in water at 70,80,95° C., respectively).

The mechanical properties and morphology of the fibers are adjusted for maximum effectiveness in terms of the concrete reinforcement demands; to contribute secondary and primary concrete reinforcement in addition to the fire resistance capacity.

The geometry (diameters and lengths) of the fibers are optimized for maximum rates of hydrolysis and dissolution of the fibers and for the optimal network of channel formation, for release of the steam (e.g., microfibers of 10-20 micrometers in diameter and 6-12 mm in length and/or macrofibers of 30-1,000 microns in diameter and 20-100 mm in length).

The effectiveness of the fibers in fire resistance enables the usage of much lower dosages of fibers relative to the standard fibers that are being used.

EXAMPLE 2

Fibers:
Poly (ethylene terphthalate) Partially Oriented Yarn fibers
Thickness: 3.00 Dtex per fiber.
Tenacity: 3.00 grams/dtex, Elongation: 85%
Spinning speed: 3,800 m/min, Intrinsic viscosity: 0.68
Spinning temperature: 295° C.
Cut length: 6 mm
Test 1:
The fibers are dispersed in the concrete following a standard mixing procedure of synthetic fibers with concrete for secondary reinforcement (70 revolutions at high speed).

Concrete mix design—Cement: 400 Kg, Sand: 600 Kg, fine aggregates: 300 Kg, coarse aggregates: 800 Kg, water: 200 Kg.

Fiber content in the concrete: 2,000 grams/cubic meter

Testing of passive fire protection for concrete is performed showing very good fire resistance, including temperature/time profiles, spalling, cracking and surface observations.

EXAMPLE 3

Fibers:
Nylon 6.6 Partially Oriented Yarn fibers
Relative viscosity: 40, Carboxyl end groups: 80 meq./KG
Fiber properties—Thickness: 1.5 Dtex per fiber. Tenacity: 3.4 grams/dtex,
Elongation: 75%
Spinning speed: 4,000 m/min, p Spinning temperature: 295° C.
Cut length: 6 mm
Test:

The fibers are dispersed in the concrete following standard mixing procedure of synthetic fibers with concrete for secondary reinforcement (70 revolutions at high speed). Concrete mix design—Cement: 400 Kg, Sand: 600 Kg, fine aggregates: 300 Kg, coarse aggregates: 800 Kg water: 200 Kg.

Fiber content in the concrete: 2,000 grams/cubic meter

Testing of passive fire protection for concrete is performed showing very good fire resistance, including temperature/time profiles, spalling, cracking and surface inspection.

EXAMPLE 4

Fibers:
Poly (vinyl alcohol coacetate) fully drawn Yarn fibers
Thickness: 1.25 Dtex per fiber.
Tenacity: 9.00 grams/dtex, Elongation: 5%
Water dissolvable at 70° C.
Cut length: 6 mm
Test:

The fibers are dispersed in the concrete following standard mixing procedure of synthetic fibers with concrete for secondary reinforcement (70 revolutions at high speed). Concrete mix design—Cement: 400 Kg, Sand: 600 Kg, fine aggregates: 300 Kg, coarse aggregates: 800 Kg water: 200 Kg.

Fiber content in the concrete: 2,000 grams/cubic meter

Testing of passive fire protection for concrete is performed showing very good fire resistance, including temperature/time profiles, spalling, cracking and surface inspection.

3. Chemical Corrosion Resisting Fibers

Synthetic fibers containing corrosion resisting chemicals are dispersed in the concrete in order to release the chemicals at the steel reinforcement corrosion spots within the concrete, thereby terminating the corrosion processes and increasing the life span of the steel and the reinforced elements.

Various release mechanisms are proposed:

In Nylon encapsulated fibers, controlled release via response of the. Nylon to pH is obtained using pH degradation sensitive Nylon polymers that degrade faster and release more protecting chemicals as the pH becomes more acidic due to carbon dioxide, sulfates and other corroding chemicals ingestion into the concretes.

In polyvinyl alcohol copolymers, with vinyl acetate made fibers that dissolve in water at ambient temperatures, following predetermined rates of dissolution, the kinetics of dissolution and chemicals release to the concrete are controlled.

Standard corrosion resistance chemicals such as nitrites, molybdenates, phosphonates, morpholines, hydrazines may be used as corrosion resisting chemicals.

Incorporation of chemicals into the fibers:

In melt spinning: via inclusion of the chemicals in the polymer during polymerization, and/or blending master batches containing the chemicals with the regular polymer chips in the extruder prior to spinning.

In wet spinning: via mixing of suspensions of the chemicals with the polymer in the dope (solution of polymer in the solvent) prior to wet spinning, or injection of suspensions of the chemicals in the spinning solvent to the spinning line prior to the spinneret.

Contents of the chemicals in the fibers within the range of 0.1%-10% are obtainable.

High strength and rigidity short cut (3-12 mm) fibers in the mortar surrounding the steel reinforcement form barrier that maintains higher osmotic pressures around the reinforcing bars, making them impermeable to the corroding carbonates and other chemicals due to the higher chemical potential within the corroded iron oxide swollen gels that prevent further diffusion into the steel protected zone. This protects the steel reinforcement against corroding carbonates, chlorides and sulfates.

High elongation fibers for increasing concrete flexibility and shear strainability:

Nylon or poly propylene or poly vinyl alcohol fibers of low degrees of orientation and high extension to break (e.g., elongation greater than 500%, tenacity lower than 3.0 grams per denier), obtained via very low draw ratios during their formation processes, characterized by low birefringence and other orientation indications (i.e., birefringence in Nylon 6.6 fibers lower than 0.040), will be added to the cementitious mixture in order to reduce the composite's modulus and increase the extension and bending breaking strains of the system to values that upgrade specific properties of the reinforced products to reach high performance demands at relatively low dosages of fibers, replacing high cost rubbers and polymeric resins that are usually added to the cementitious system for equivalent effects. The fibers durability at high temperatures and their environmental stability, imply clear advantage over the standard additives.

The invention claimed is:

1. A structure comprising: a matrix including a surface, the matrix reinforced with a plurality of polymeric fibers, the polymeric fibers including at least one a biological agent or a chemical agent, the polymeric fibers protruding from at least a portion of the surface, the polymeric fibers being capable of endowing the at least a portion of the surface with biological or chemical resistance, and the fiber content of the polymeric fibers protruding from the surface is 10 to 100 fibers per square millimeter.

2. The structure according to claim 1, wherein the biological agent is a biocide reactive against microorganism growth and is incorporated into the fibers.

3. The structure according to claim 2, wherein said biocide is a quorum sensing antagonist capable of disturbing biofilm formation or bacteria production sequence.

4. The structure according to claim 3, wherein the amount of the quorum antagonist in the fibers is between 0.001% and 5.00% wt.

5. A structure comprising: a matrix including a surface, the matrix includes concrete and is reinforced with a plurality of polymeric fibers protruding from at least a portion of the surface, the polymeric fibers including at least one biological agent or chemical agent, and being capable of endowing the at least a portion of the surface with biological or chemical resistance, and the fiber content of the polymeric fibers protruding from the surface is 10 to 100 fibers per square millimeter.

6. The structure according to claim 5, wherein the volume fraction of the fibers in the concrete at the surface of the structure is within the range of 0.025% to 25%.

7. A process for manufacturing a structure reinforced with a plurality of polymeric fibers protruding from at least a portion of its surface, the fibers being capable of endowing the at least a portion of the surface with biological or chemical resistance, the process comprising: obtaining a mixture of a desired matrix material and a plurality of polymeric fibers containing or being coated with a biological or chemical agent; forming a structure of said mixture; and, treating at least a portion of the structure surface to expose the fibers' ends; to thereby obtain a structure including a matrix with a plurality of polymeric fibers disposed therein and protruding from at least a portion of matrix at the structure surface, the fibers including at least one biological or chemical agent, and the fiber.

8. The process according to claim 7, wherein treating at least a portion of the structure surface includes mechanical brushing of the structure surface.

9. A process for manufacturing a structure reinforced with a plurality of polymeric fibers protruding from at least a portion of its surface, the fibers being capable of endowing the at least a portion of the surface with biological or chemical resistance, the process comprising: obtaining a structure of a desired material and shape; coating at least a portion of the structure surface with a material comprising a plurality of polymeric fibers including at least one biological or chemical agent; and, treating the coating layer to expose the fibers' ends, such that the fibers protruding from the material along an outward facing surface; wherein the fiber concentration of the polymeric fibers protruding from at least a portion of the outward facing surface is 10 to 100 fibers per square millimeter.

10. The process according to claim 9, wherein the material comprising a plurality of polymeric fibers includes grout.

11. The process according to claim 10, wherein the coating includes applying the polymeric fibers by at least one of spraying or mechanical coating.

* * * * *